United States Patent [19]
Barton et al.

[11] 3,957,253
[45] May 18, 1976

[54] APPARATUS FOR AQUEOUS SOLUTIONS OF PURE SODIUM HYDROSULFITE

[75] Inventors: Robert W. Barton, Chesapeake; Joseph A. Cannizzaro; Mearl A. Kise, both of Portsmouth, all of Va.

[73] Assignee: Virginia Chemicals Inc., Portsmouth, Va.

[22] Filed: July 30, 1973

[21] Appl. No.: 384,086

[52] U.S. Cl. .................................. 259/8; 259/154
[51] Int. Cl.² ...................... B01F 7/22; B01F 15/04
[58] Field of Search .............. 259/5, 6, 7, 8, 9, 10, 259/21–26, 40–46, 64–69, 154, 95

[56] References Cited
UNITED STATES PATENTS

| | | | |
|---|---|---|---|
| 2,592,245 | 8/1952 | Clotworthy | 259/67 |
| 2,674,256 | 4/1954 | Ullman | 259/95 |
| 2,900,176 | 8/1959 | Krogel | 259/64 X |
| 3,161,203 | 12/1964 | Hathorn | 259/95 X |
| 3,591,147 | 7/1971 | Anderson | 259/165 |
| 3,830,473 | 8/1974 | Lieferman | 259/95 |

Primary Examiner—Robert W. Jenkins
Assistant Examiner—Alan Cantor

[57] ABSTRACT

Apparatus and method are disclosed for continuously handling sodium hydrosulfite for use in textile dyeing including means for receiving the pure dry chemical in semi-bulk returnable containers, for dissolving the same in a caustic solution and for storing the resulting solution in low inventory automatic make-up tanks. The novel resulting solution is stabilized against decomposition and may be metered to specified locations in the textile mill.

7 Claims, 1 Drawing Figure

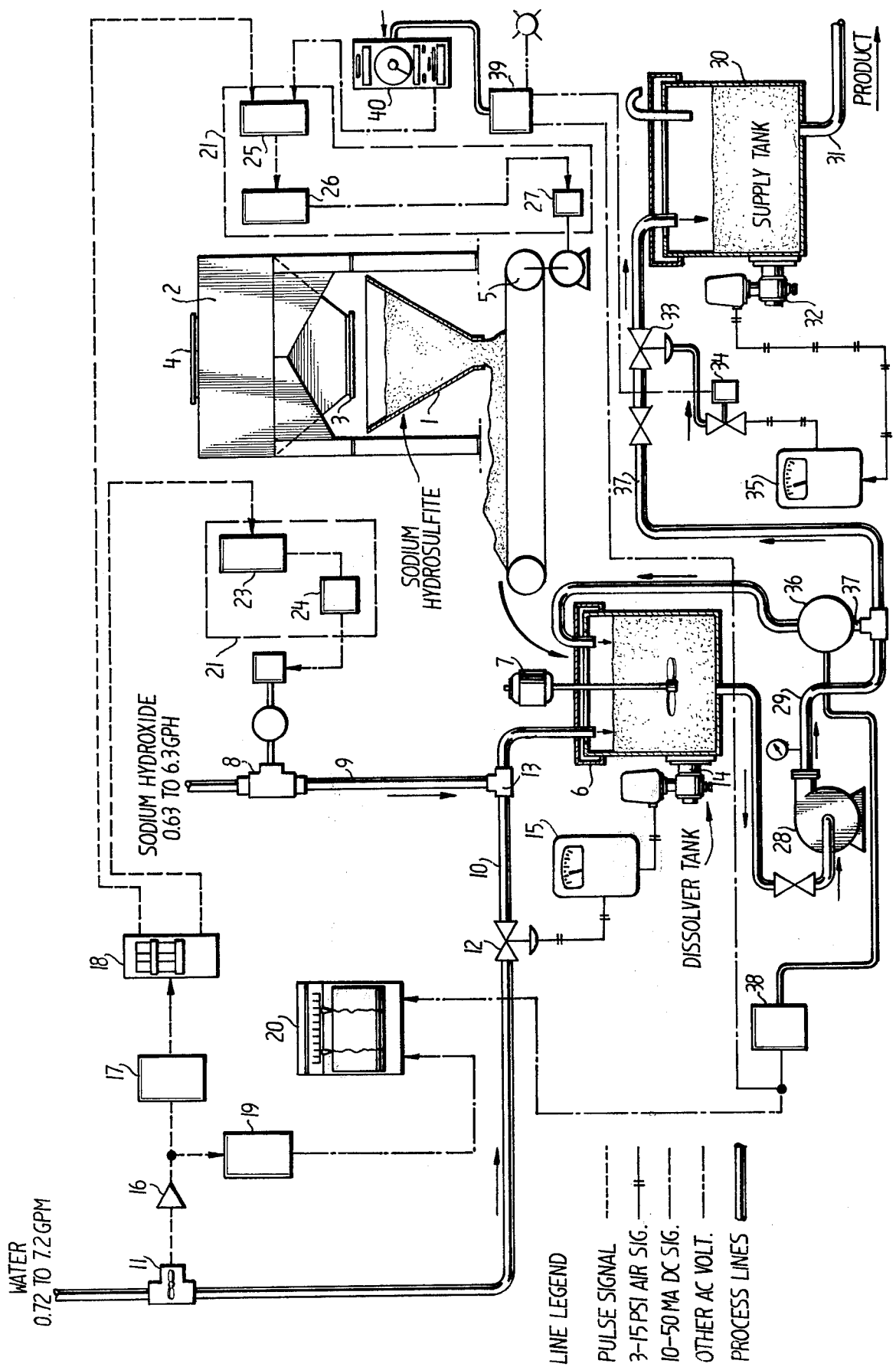

APPARATUS FOR AQUEOUS SOLUTIONS OF PURE SODIUM HYDROSULFITE

BACKGROUND OF THE INVENTION

There are currently serious economic and safety factor problems encountered in procedures for handling the bleaching agent sodium hydrosulfite in certain mills and in related applications. The problem arises especially among textile manufacturers who desire to feed all components automatically to dyeing operations. The use of liquid feeds is essential for computer controlled, fully automated operation. Sodium hydrosulfite is today delivered to a textile mill, for example, in relatively small quantities of liquid, say approximately 4,000 and 6,000 pounds. To maintain the liquid sodium hydrosulfite in such a state, relatively large quantities of caustic soda are now mixed into this solution, say, approximately one weight percent concentration. Even so, the stability and storage life of the solution is on the order of days only since there is significant sodium hydrosulfite reduction. The concentration of solution at use time is now often significantly different from that at the time of mixing or delivery. Close coordination of delivery and stock depletion with mill shut-downs, vacation times, etc., naturally pose significant problems.

SUMMARY OF THE INVENTION

The invention provides a solution to the problems experienced with prior art apparatus and methods for handling sodium hydrosulfite. The pure dry chemical may be stored at the site in large quantities for up to three months. As the aqueous solution is required, the chemical may be metered into a mixing tank with a metered quantity of water and caustic soda solution to provide an essentially pure solution which may be metered out as required for on site use. Due to the purity of the dry chemical, resultant solution contains substantially less stabilizing caustic soda, relative to the amount of water, than found in previously available commercial compositions, yet because of the continuous manufacture of the solution, decomposition of the sodium hydrosulfite is minimized.

BRIEF DESCRIPTION OF THE DRAWING

The FIGURE illustrates a schematic of the inventive apparatus used to produce the sodium hydrosulfite solution.

DESCRIPTION OF THE PREFERRED EMBODIMENTS

The system consists of semi-bulk returnable shipping containers and unloading stands, a dry chemical feeder, caustic pump, fluid controls, a densimeter for monitoring and trimming solution strength, a dissolver tank and a vertical storage tank from which the solution is drawn to process. A typical arrangement is shown in the FIGURE.

Referring to the FIGURE, sodium hydrosulfite is delivered to a mill site location in dry or powder form in any bulk quantities desired. For example, 3,500 lb. quantities have been delivered with satisfactory storage and handling results. Sodium hydrosulfite 1 thus delivered is contained at one-site location in commercially available, returnable containers 2. As indicated, the sodium hydrosulfite can be stored in container 2 in its dry state for as long as 3 months. To protect the sodium hydrosulfite in container 2 from air, moisture and other reducing elements, a sliding door 3 is disposed at the bottom of the container and a sealed barrel closure 4 at the top. The door 3 may be open as indicated by the arrow and shut at the termination of use to seal the container 2 airtight.

Dry sodium hydrosulfite 1 delivered to the mill site in container 2 is disposed above motorized conveyor feeder 5. A series of containers 2 can be, of course, placed in a row with a conveyor belt, not shown, thereunder, the belt being controllably operable to deliver the dry sodium hydrosulfite to the feeder 5. From feeder 5, the dry powder is directed to the dissolver tank 6 which then mixes the sodium hydrosulfite with caustic solution by stirring with mixer 7. The dissolver tank is covered except for the openings to admit caustic soda and water, via line 10, sodium hydrosulfite via feeder 5 and sample solution via line 37. This minimizes contact with the atmosphere and resultant reduction of the solution. The mixing operation may be conducted satisfactorily in a temperature range of from 32° to 110°F.

Liquid caustic soda is moved by pump 8 through pipe 9 directly into a steady stream of water flowing in pipe 10. The water flows through meter 11 and valve 12 to mix with the caustic soda at point 13. A level control 14 automatically reads the level in dissolver tank 6 and controls the solution input to the desired level by coaction with valve 12. Meter 15 shows the liquid level.

Meter 11 sends a pulse signal to pre-amplifier 16 and via scaler 17 to the blend ratio controller 18. A signal is also directed from pre-amplifier 16 via processing circuitry 19 to recorder 20. Blend ratio controller 18 produces two outputs, one to the controller 21 for caustic soda pump 8 and one to the controller 22 for conveyor feeder 5. Controller 21 may comprise a driver unit 23 and a relay 24, as shown. Controller 22 may comprise a trim unit 25, pulse to current converter 26 and rectifier 27. Thus the appropriate amounts of caustic soda and sodium hydrosulfite are metered into the dissolver tank 6 in proportion to the amount of water passing meter 11. concentrations to within ± 2.5 weight percent can be maintained in this system. When valve 12 shuts in response to a high level signal from level control 14, no output is produced by blend ratio controller 18, and the feeder 5 stops.

The sodium hydrosulfite in solution may then be delivered via pump 28 and pipe 29 directly to the point of application if desired. However, it is preferred to use a covered and vented storage tank 30 wherein the stabilized sodium hydrosulfite solution is held prior to delivery to the in-plant locations through pipe 31. Tank 30 may be refrigerated if extended storage is anticipated prior to use. A storage tank level control 32 can be placed in connection with the storage tank 30 which by preselected control of valve 33 may control the volume of solution in the tank. Meter 35 shows the level in the storage tank. Obviously, if valve 33 is restricted or switched into a non-flow state, the level in dissolver tank 6 will increase to a point at which level control 14 will adjust valve 12.

In connection with solution flow pipe 29, there is provided a densimeter 36 for sensing the density of the solution. A sample line 37 recycles the sample flow back to the dissolver tank 6. The output from the densimeter is directed via processing circuitry 38 to recorder 20. The output from circuitry 38 is also directed via density alarm 39 to density controller 40. If the density of the mixture leaving tank 6 is at variance with the setpoint of controller 40, a signal is transmitted to trim unit 25 which may be set to adjust the speed of feeder 5 within, say, plus or minus 10% of the setting of blend ratio controller 18. When the density is beyond this range, alarm 39 may be set to actuate and to close valve 33 via solenoid 34, as indicated. At such a time, the operator could perform any necessary trouble shooting operations to return the system to automatic operation, or operate the feeder manually until the problem is rectified.

In practice, the following commercially available components have been found acceptable for use in this system, though one skilled in the art will appreciate that many variations are possible within the scope of this invention:

| Element in Figure | Available Component |
| --- | --- |
| 11 | Foxboro M/81SFSC3, ½inch |
| 12, 33 | Foxboro M/V4A Needle |
| 14, 32 | Foxboro M/13FA-MS315 W/1AS-F |
| 15, 35 | Foxboro M/43A-A4 W/PC3-15 |
| 16 | Foxboro A2020LA W/A2021BZ |
| 17 | Foxboro M/99M-100SP |
| 18 | Foxboro M/99M-212 |
| 19 | Foxboro M/FR316C-5-2, M/FR316C-5 with large capacitor output network |
| 20 | Foxboro M/6420 HF-0 |
| 23 | Foxboro M/99M-731 |
| 24 | Foxboro A93746 |
| 25 | Foxboro M/99M-720H |
| 26 | Foxboro M/FR316C-5-2 |
| 38 | Foxboro M/66BT |
| 39 | Foxboro M63U-BT-OHEA |
| 40 | Foxboro M/62H-4E-O |

This listing is merely representative and components not listed may be selected as needed by one of ordinary skill in the art.

OPERATION

Once a container 2 is placed on the stand and its slide gate 3 removed, feeder 5 will proportion the hydrosulfite into the caustic-water solution, both chemical feed rates being automatically paced with the inlet water flow, as discussed. The solution will then be pumped to storage tank 30 in which a constant level will be maintained. By operating with essentially constant level in the dissolver tank and the storage tank and minimizing flow of air over the surface of the liquids in these tanks, the solution and the samll volume of air essentially trapped under the tank covers interact to form a primarily nitrogen atmosphere over the solution, thus minimizing further reduction of the solution during continued system operation. From the storage tank, the solution will be withdrawn either by gravity or will be pumped through liquid meters to the application points.

Under normal conditions tank 6 is sized so that at the maximum feed rate approximately fifteen minutes are required as a minimum for complete solution of sodium hydrosulfite in caustic to form a solution containing 1% caustic and 15% sodium hydrosulfite by weight. Tank 30 is sized to provide 1 to 2 hour's reserve supply for a particular plant in the event that the feed system is shut down for minor repairs.

Feeder and fluid controls will all meet the specified accuracy over a 10/1 span, i.e., if the normal draw is 100 pounds per hour, the system will supply solutions containing 20 to 200 pounds of dry product without adjustment. Manual resets can be used to move the control range upward on demand. Recorded signals will be the solution density, and the solution flow-rate. Alarms also may be installed on the caustic pump output and holding tank 30 level.

In solutions having a concentration of sodium hydrosulfite varying from between 0.2% to 15% by weight, it is necessary to use only approximately 1% by weight caustic soda. This low caustic soda ingredient is made possible since the sodium hydrosulfite solution is available for use almost immediately after mixing. Thus, no time exposure to air and other reducing elements occurs. The concentration of solution at the use point and in the original mixture is almost identical. Prior known commercial solutions had a maximum of 11% by weight of the sodium hydrosulfite because refrigeration was required and included from 0.9% to 1.1% caustic soda. Concentration of the prior art solutions at the use point is unreliable.

A typical solution which has been found to be highly satisfactory in the practice of the invention is:

| | | |
| --- | --- | --- |
| $Na_2S_2O_4$ | 10.0% | (by weight) |
| NaOH | 1.0% | |
| Inerts | 0.8% | |
| Water | 88.2% | |

With a concentration of 0.2% to 15% by weight of sodium hydrosulfite and approximately 1.0% by weight sodium hydroxide, water from 82.8% to 98.78% by weight and inert from 0.016% to 1.2% by weight may be used with satisfactory results. This solution, which has a saturation temperature of less than 34°F., has a stability factor of less than 2% decomposition in 48 hours at 90°F; with the initial pH factor of 11.7 and the initial specific gravity of 1.0925. Because pure sodium hydrosulfite may be used in this system, the solution has approximately 5% less impurities than known commercial solutions, which do not use the pure chemical due to the instability of the solution and associated problems of shipment and storage. The solution may be used with pH factor in the range of 8.0 to 12, with acceptable results.

Among the advantages achieved through the practice of the invention are the following:

A. The complete system is competitive from a materials handling viewpoint with liquid sodium hydrosulfite, and offers some additional benefits. The inventory and delivery frequency problem resulting from the transportation of small quantities (4000–6000 pounds) liquid sodium hydrosulfite is eliminated, as the mill now may take truckloads in 35,000 pound quantities. Inventory of the dry chemical is stable and can be kept 3 months. Shutdowns for maintenance and/or for vacation periods to not require tight coordination of inventory depletion and quitting time; and start-ups are not dependent upon delivery of a new load of hydrosulfite on the day preceding the beginning of operation. Further, this system may be operated without the use of either a nitrogen blanket or refrigeration as required in the prior art systems. Finally, the on-site prepared hydrosulfite solution is essentially pure sodium hydrosulfite and caustic soda. Because the solution is pure it can be delivered to the point of application in the mill with a loss no greater than 1 percent.

B. Economically, the container 2 contains 3500 pounds net weight, or the equivalent of 14 drums (250-100 pound net) of sodium hydrosulfite. The container may be designed to be handled with a fork-lift truck and, hence, labor for materials handling during unloading and in-plant movement will be reduced to a minimum. Larger containers of up to 5000 pounds net may also be used. At present, savings of 0.4 cents per pound are possible by replacing manual handling with a lift truck operation.

C. The cost of weighing, hand-carrying, and dumping small charges of hydrosulfite can be eliminated. Savings of 0.5 cents a pound are possible in many cases by using fluid meters in place of hand-batching methods.

D. Losses of hydrosulfite through decomposition can be reduced to a negligible value. In many textile mills, batch mixtures of sodium hydrosulfite and caustic soda are prepared. Although initially these solutions are quite stable, during the time between preparation and use, losses of 5 percent may occur as a result of air contamination. This FIGURE will vary in different mills and primarily is a function of the amount and time the solutions are in contact with air. Assuming the 5 percent loss is typical of a batch system and 1 percent in a continuous system, savings of 4 percent or 1.2 cents per pound will be available.

E. Since the solution will be delivered directly to continuous textile mill ranges, the amount of reduction will be constant and end-to-end color matching is better than that obtained with solutions prepared batchwise.

Having described an invention in such a manner as to enable one skilled in the art to make and use it, we claim:

1. Apparatus for preparing a solution of two liquids and a powdered solute, comprising:
   A. a dissolving tank;
   B. means disposed in said dissolving tank for mixing any contents thereof;
   C. sources of first and second liquids and a source of powdered solute;
   D. conduit means for admitting a stream of the first liquid into said dissolving tank;
   E. means for injecting a variable weight of the second liquid into said stream of the first liquid in accordance with the weight of the first liquid flowing in said conduit means;
   F. means for admitting to said dissolving tank a variable weight of said powdered solute in accordance with the weight of the first liquid flowing in said conduit means;
   G. means for delivering mixed solution from said dissolving tank to use points; and
   H. means for monitoring the flow rate of the first liquid in said conduit means and producing an output proportional thereto.

2. The apparatus of claim 1 wherein said injecting means comprises a pump connected to said second liquid source for injecting said second liquid into said stream of said first liquid and means responsive to the output of said flow monitoring means for operating said pump to effect said injecting.

3. The apparatus of claim 1 further wherein said admitting means comprises a container for receiving the powdered solute and having an opening, motorized conveyor means for carrying said powdered solute from said opening to said tank and discharging it thereinto and means responsive to the output of said flow monitoring means for operating said conveyor to effect said admitting.

4. The apparatus of claim 1 further comprising:
   I. means for monitoring the solution level in said dissolving tank;
   J. means for closing said conduit means in response to a high level signal from said level monitoring means, whereby said injecting and admitting means are made inoperative due to no flow of the first liquid in said conduit means;
   said injecting means comprising a pump connected to said second liquid source for injecting the second liquid into said stream of the first liquid and means responsive to the output of said flow monitoring means for operating said pump to effect said injecting.

5. The apparatus of claim 1 further comprising:
   I. means for monitoring the solution level in said dissolving tank;
   J. means for closing said conduit means in response to a high level signal from said level monitoring means, whereby said injecting and admitting means are made inoperative due to no flow of the first liquid in said conduit means; and
   said admitting means comprising a container for receiving the powdered solute and having an opening, motorized conveyor means for carrying said powdered solute from said opening to said tank and discharging it thereinto and means responsive to the output of said flow monitoring means for operating said conveyor to effect said admitting.

6. The apparatus of claim 1 further comprising:
   I. means for monitoring the solution level in said dissolving tank;
   J. means for closing said conduit means in response to a high level signal from said level monitoring means, whereby said injecting and admitting means are made inoperative due to no flow of the first in said conduit means; and
   said injecting means comprising a pump connected to said second liquid source for injecting the second liquid into said stream of the first liquid and means responsive to the output of said flow monitoring means for operating said pump to effect said injecting; and said admitting means comprising a container for receiving the powdered solute and having an opening, motorized conveyor means for carrying said powdered solute from said opening to said tank and discharging it thereinto and means responsive to the output of said flow monitoring means for operating said conveyor to effect said admitting.

7. The apparatus of claim 1 wherein the first liquid is water; the second liquid, caustic soda solution; and the powdered solute, sodium hydrosulfite, and further comprising:
   I. means for monitoring the solution level in said dissolving tank;
   J. means for closing said conduit means in response to a high level signal from said level monitoring means whereby said injecting and admitting means are made inoperative due to no flow of water in said conduit means;
   said injecting means comprising a pump connected to said caustic soda source for injecting soda into said stream of water and means responsive to the output of said flow monitoring means for operating said pump to effect said injecting;
   said admitting means comprising a container for receiving sodium hydrosulfite and having an opening, motorized conveyor means for carrying said sodium hydrosulfite from said opening to said vessel and discharging it thereinto and means responsive to the output of said flow monitoring means for operating said conveyor to effect said admitting; said delivery means comprising a storage tank;

a second conduit means for connecting said dissolving tank to said storage tank; second means for monitoring the solution level in said storage tank; and means for closing said second conduit means in response to a high level signal from said second level monitoring means;

K. means for covering the dissolving tank and the storage tank to minimize contact of air with the solution, whereby the solution and the small volume of air essentially trapped under said cover interact to form a primarily nitrogen atmosphere over the solution;

L. means for monitoring the density of the effluent from said dissolving tank and producing an output proportional thereto;

M. means for further adjusting the rate at which sodium hydrosulfite is admitted to said dissolving tank by said admitting means in response to a departure of the output of said density monitoring means from a predetermined norm; and N. means for rendering said delivering means inoperative in response to a departure of the output of said density monitoring means from a predetermined norm.

* * * * *